United States Patent [19]

Engle

[11] Patent Number: 4,702,291
[45] Date of Patent: Oct. 27, 1987

[54] PROPULSION SYSTEM FOR INTEGRAL TRAINS

[75] Inventor: Thomas H. Engle, Cape Vincent, N.Y.

[73] Assignee: General Signal Corporation, Stamford, Conn.

[21] Appl. No.: 776,766

[22] Filed: Sep. 16, 1985

[51] Int. Cl.$^4$ ............................................. B61C 7/04
[52] U.S. Cl. .................................................. 105/35
[58] Field of Search .................. 105/1 A, 35, 26, 133, 105/96, 96.1, 463.1; 180/294, 295, 298, 299, 179, 65.4, 65.6; 295/38

[56] References Cited

U.S. PATENT DOCUMENTS

| | | | |
|---|---|---|---|
| 1,685,569 | 9/1928 | Jupp | 105/35 X |
| 1,803,876 | 5/1931 | Sperry | 105/35 X |
| 2,036,194 | 4/1936 | Burrows et al. | 295/38 X |
| 2,249,628 | 6/1941 | Essl | 105/35 |
| 2,299,420 | 10/1942 | Essl | 105/35 |
| 2,317,849 | 4/1943 | Essl | 105/35 |
| 2,337,717 | 12/1943 | Hines | 105/61 X |
| 2,342,724 | 2/1944 | Candee | 105/35 X |
| 2,385,642 | 9/1945 | Peterson | 105/35 |
| 2,505,183 | 4/1950 | Henrichsen | 105/96 X |
| 2,581,596 | 1/1952 | Nims | 180/65.4 |
| 2,629,058 | 2/1953 | Lillquist | 105/35 X |
| 3,209,704 | 10/1965 | Gratzmuller | 105/35 |
| 3,678,864 | 7/1972 | Gutridge | 105/35 X |
| 3,713,504 | 1/1973 | Shimer et al. | 105/35 X |
| 3,783,795 | 1/1974 | Helmer | 105/61 |
| 4,325,451 | 4/1982 | Umeda | 180/294 |
| 4,350,057 | 9/1982 | Kishi et al. | 74/866 |
| 4,418,777 | 1/1983 | Stockton | 180/65.6 |
| 4,439,833 | 3/1984 | Yamaguchi et al. | 180/179 X |
| 4,478,184 | 10/1984 | Shinoda et al. | 180/179 X |
| 4,541,052 | 9/1985 | McCulloch | 180/179 X |

FOREIGN PATENT DOCUMENTS

| | | | |
|---|---|---|---|
| 1069172 | 11/1959 | Fed. Rep. of Germany | 105/96 |
| 1917640 | 10/1970 | Fed. Rep. of Germany | 105/35 |
| 2019330 | 10/1979 | United Kingdom | 180/298 |

OTHER PUBLICATIONS

"New Diesel Locomotive Design for BR Freight", Mar./Apr. 1976, Imeche Railway Engineer, vol. 1, No. 2, p. 47.

Primary Examiner—Robert B. Reeves
Assistant Examiner—Scott H. Werny
Attorney, Agent, or Firm—Barnes & Thornburg

[57] ABSTRACT

A rail vehicle propulsion system having an engine whose speed is a function of a selected vehicle speed, an alternator connected to the engine for generating an electrical signal to drive an electric motor connected to the axle by a variable automatic mechanical transmission. The electric motor reflects the load on the axle to the engine through the alternator. The alternator drives a plurality of electric motor-transmission combinations. For ease of servicing, the engine and alternator are mounted on a removable pallet.

11 Claims, 13 Drawing Figures

PROPULSION SYSTEM FOR INTEGRAL TRAINS

BACKGROUND AND SUMMARY OF THE INVENTION

The present invention relates generally to an improved train, and more specifically to integral trains and an intermodal integral train for transporting over-the-road vehicles or loads.

The design of special cars to be used in a railroad system to carry containers or trucks or truck trailers has generally been modification of existing railroad stock. These systems have not been designed to accommodate for the specific loads thus, have not taken advantage of these lighter loads. The economy and operation as well as original material were not taken into account.

An integral train is a train made up of a number of subtrains called elements. Each element consists of one or two power cabs (locomotives) and a fixed number of cars. The cars and power cabs are tightly coupled together in order to reduce the normal slack between the cars. The reduction of the slack results in a corresponding reduction in the dynamic forces which the cars are required to withstand during the run in and out of the train slack. The reduction of the dynamic forces allows for the use of lighter cars, which allows for an increase in the cargo weight for a given overall train weight and therefore an increase in train efficiency. Additional improvements in efficiency were to be obtained through the truck design and from other sources.

A complete train would consist of a number of elements. The elements could be rapidly and automatically connected together to form a single train. It is expected that in certain cases elements would be dispatched to pick up cargo and then brought together to form a single train. The cargo could then be transported to the destination and the elements separated. Each element could then deliver its cargo to the desired location. Each element would be able to function as a separate train or as a portion of a complete train. The complete train could be controlled from any element in the train. The most likely place for control would be the element at the head end of the train, but it was anticipated that under circumstances such as a failure in the leading unit, the train would be controlled from a following element.

Federal Regulations require brake inspections whenever a train is made up and periodically during its operation. The inspection procedure involves the application and release of the train brakes and an inspection of each car on the train to verify that the brakes function as expected. This process is very time consuming. A communications cable running through the train makes it possible for the control system automatically and rapidly to perform the brake inspection.

Thus, it is an object of the present invention to provide a uniquely designed train system to accommodate containers, trucks and truck trailers.

Another object of the present invention is to provide a unique car structure which is essentially a continuous platform.

Yet another object of the present invention is to provide a unique power system designed to eliminate the all electric transmission system and use instead common commercial frequency AC motors and alternators to transmit power, with common automotive transmissions to accommodate starting and gear changing.

Still another object of the present invention is to provide a unique control system for railroad trains.

Another object of the present invention is to provide a unique communication and fault query system.

A further object of the present invention is to provide a unique portable stanchion for fastening truck trailers to a deck.

Still an even further object of the present invention is to provide a container securing device for a railroad car.

An even further object of the present invention is to eliminate the conventional locomotive by incorporating its functions into various parts of the load carrying structure.

Still another object of the present invention is to arrange the various locomotive functions so that they can be easily serviced while the train is being loaded/unloaded.

Other objects, advantages and novel features of the present invention will become apparent from the following detailed description of the invention when considered in conjunction with the accompanying drawings.

DETAILED DESCRIPTION OF THE DRAWINGS

Figures 1, 2:
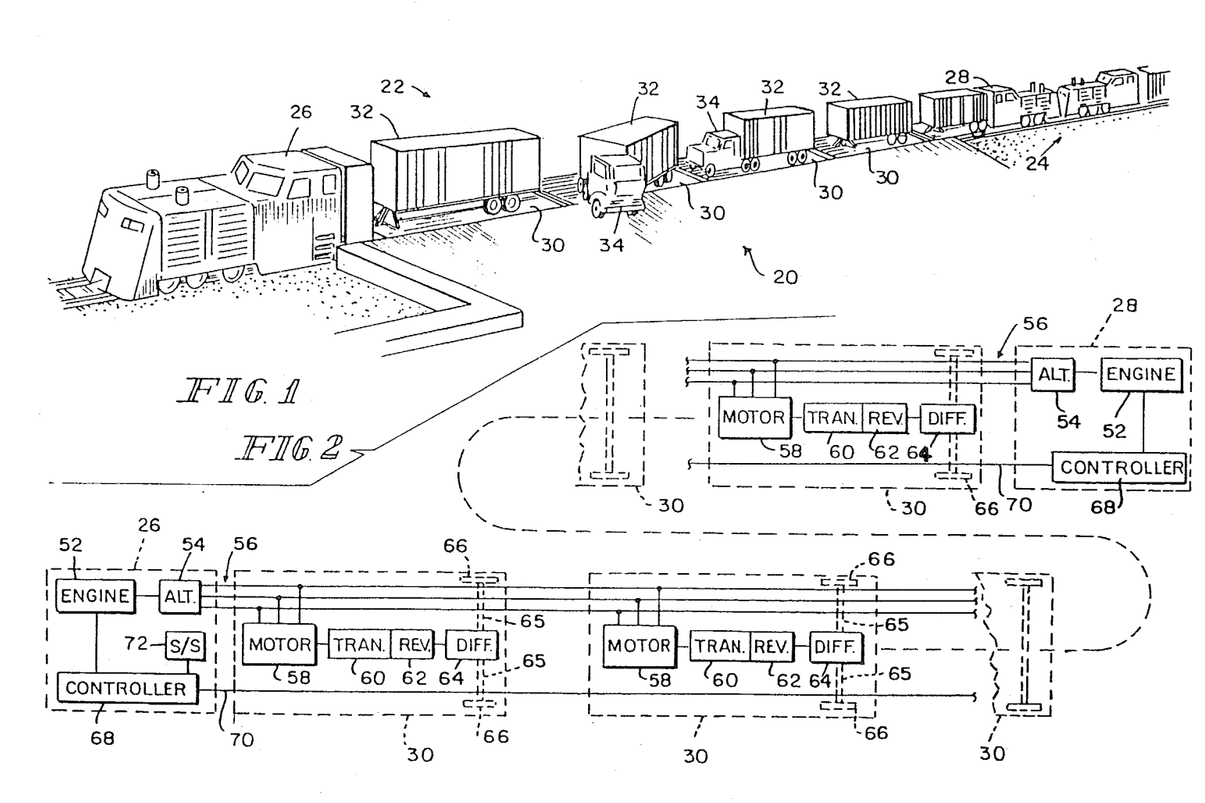
FIG. 1 is a perspective view of an integral train incorporating the principles of the present invention.
FIG. 2 is a block diagram of a propulsion system incorporating the principles of the present invention.

As illustrated in FIG. 1, a train 20 includes a plurality of train sections 22 and 24 which represent one of a plurality of train sections. Each section includes a pair of control cabs 26 and 28 at each end of the section. Note that conventional locomotives could be used at these locations. As will be explained in more detail below, one of the control cabs is considered the master while the other is the slave and are interconnected to provide the appropriate control of the propulsion and braking system. Connected between the two control cabs 26 and 28 is a plurality of cars 30 forming a continuous deck. The deck is structured such that loads for example, trailers 32 may be secured to the cars 30 on a specific car or across the juncture of a pair of cars. The trailers 32 may be secured by themselves or in combination with the truck caps 34. By providing a continuous decking, the train 20 can be side loaded from a flush platform. This allows simultaneous loading of trucks, thus eliminating the necessity to wait for a loading crane.

The control cabs 26 and 28 are not control cabs in the conventional sense. The propulsion system 50 is considered a distributive propulsion system as illustrated in FIG. 2. The control cabs 26 and 28 include a mechanical engine 52 driving an electrical alternator 54. The output of the alternator 54 is three phase current whose frequency and voltage are a function of the speed of the engine 52. This current is transmitted down a three phase wire system 56 to a plurality of electric motors 58 distributed throughout the cars 30. Each of the electric motors 58 are connected to a respective transmission 60 which includes a directional control reversing gear 62. The output of the directional control reversing gear 20 drives a differential 64 to which a pair of axles 65 and wheels 66 are connected. Each of the control cabs 26 and 28 include a controller 68 which can control the speed of all of the engines based on a throttle setting selected by the operator in one cab. The controller 68 also provides control signals via line 70 to the transmission 60 and the reversing gear 62. A train speed sensor 72 on a non-powered axle provides an input signal to controller 68. The controller 68 selects the gears of the transmission and the shift points as a function of the measured speed of the train and the throttle setting.

For a 1,050 foot train element the five cars 30 adjacent to each of the control cabs 26 and 28 include the motor, transmission, reversing gear and differential.

Making the train as light as possible allows the use of lighter motive power systems. The engine 52 can be either a 525 HP General Motor 12 Cylinder or a 750 HP General Motor 16 Cylinder V72 two stroke cycle diesel engine. These are the standard engines used on highway trucks. The engines 52 will drive a 600 killowatt alternator 54 at variable speeds from 500 to 2,000 RPM's producing a three phase current from 15 to 66 hertz and up to 480 volts. As will be explained below, the schematic of FIG. 2 includes a pair of engines 52 and a pair of alternators 54 therefore there is approximately 1,500 horse powers available at each end of the train element. The electric motors 58 in the cars 30 may be a 300 HP squirrel cage induction motor with an Allison MT644 automatic transmission. The controller 68 would receive an input from the operator which could be the standard eight step engine speed signal for rail locomotives. A speed governor is provided which controls the engine speed 52 based on the position of the eight step controller.

The regulation of the power at the wheel 66 for any given speed of engine 52 will be handled by gear changes in the automatic transmission in combination with the three phase electrical signal provided by alternator 54 to the individual motors 58. While the gear selection for the automatic transmission 60 will be governed by train speed from controller 68, the hydrodynamic torque converter will make up for both torque demand and wheel diameter differences to permit the full power from the electric motor 58 to be converted to appropriate torque at the wheel. Increasing loads on the wheels brought about by, for example the train slowing on a grade, will cause either increased torque converter slip or an automatic transmission downshift. Either of these will increase the torque to balance the road load requirement. Thus, the transmission will automatically adapt itself to load changes. The controller 68 will also govern the transmission shift points in accordance with train speed as a turn by sensor 72 from the wheel speed of a non-powered axle. As train speed picks up, the transmission will unload, decreasing torque which permits the transmission to automatically upshift. This maintains engine load essentially constant. When the train speed nears synchronism with the engine RPM in the top transmission gear, torque demand and engine load will be balanced and the engine governor will reduce fuel to maintain engine and hence train speed.

As can be seen, the propulsion system has been distributed over two cabs and ten cars per element. In prior art diesel electric locomotives, the propulsion is concentrated in the locomotives which have had weight or ballast added to increase traction. Thus, the train is carrying and must be designed for non-revenue weight. The present train uses the weight of the freight as ballast on the cars with powered axles and, thus, reduces the weight of the cab and powered cars.

The prior art transmission system includes a generator driven at engine speed which feeds power to an electric traction motor connected to the axle through gears. The traction motors must be designed for high torque during train start up and include current measuring and limiting devices to minimize traction motor overheating at low speeds. These systems also include switching and control circuits to accommodate the increase and high voltages at high speeds. The present transmission system uses a truck automatic transmission between the electrical traction motor and the axle and drives commercially available 60 Hz motors with three phase power lines at engine shaft speed. Thus, special electric motors, special generators and complicated switch gears are eliminated.

Figure 3:
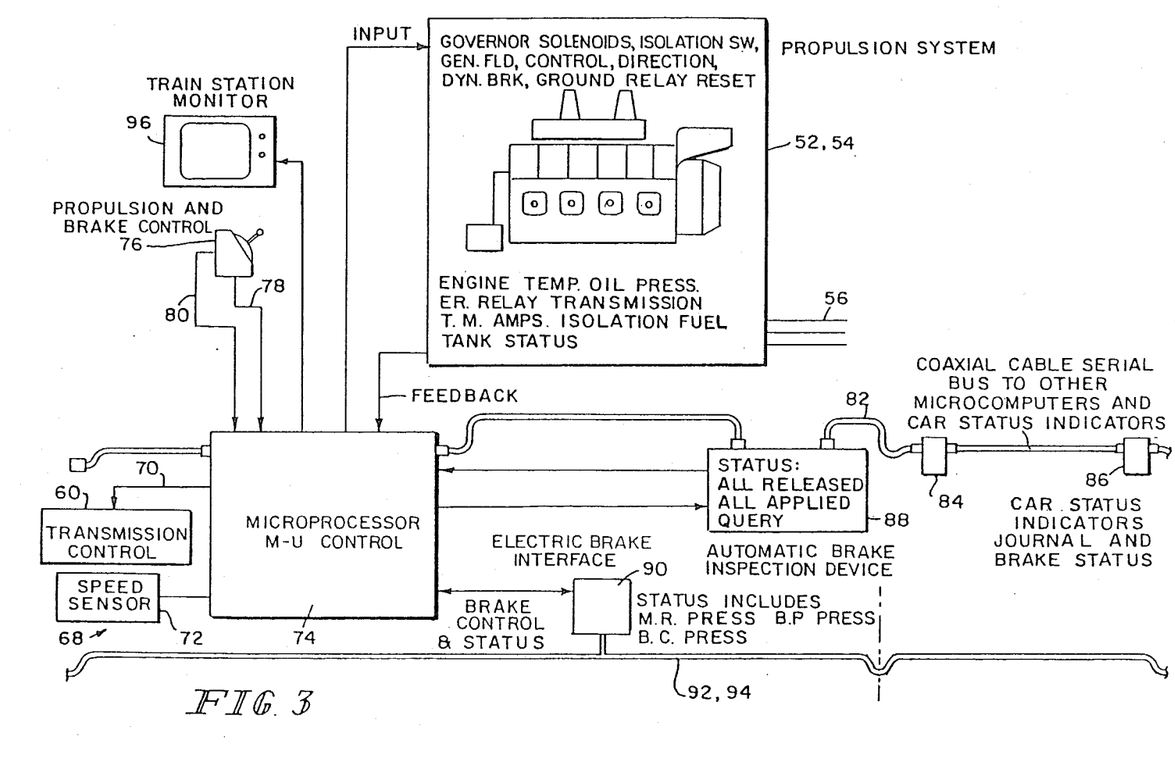
FIG. 3 is a block diagram of a control system incorporating the principles of the present invention.

A more detailed schematic of the control system in the control cab is illustrated in FIG. 3. The controller 68 includes a microprocessor controller 74 which is connected to the manual master propulsion and brake control 76 which provides propulsion control signals for the eight propulsion settings over line 78 and the brake control signals over line 80. These are electrical signals provided to the microprocessor. The electric signals from control element 76 are converted to speed demand signals to the engine governor 52. These signals generally include the A, B, C and D command signals, identical with conventional locomotive governor solenoid control signals and other elements of the motor control which are well known in the art. The condition of the engine and alternator are fed back to the microprocessor controller 74.

The microprocessor controller 74 is connected throughout the train element to each of the individual cars 30 and to the microprocessor controller in the other cab which forms a train element by a coaxial cable serial bus 82. Connected in each of the cars to the serial bus 82 are journal bearing heat detectors 84 and brake status detectors 86. A bearing status and brake application query circuit 88 may include a tone generator and driver which applies a specific tone to the coaxial serial bus 82. The heat sensor 84 and the brake sensor 86 could include tuned devices which will cause the transmission line to be essentially shorted at a specific frequency. Thus, when the tone generator at one end transmits a signal at that frequency, it will be propagated to the other end with little attenuation if there is not a hot journal bearing and the brakes are not applied. If hot condition exists or the brakes are applied during a test sequence somewhere between the transmitter and receiver, the signal will be substantially attenuated and this condition would be sensed and reported at the receiving end.

Since a hot journal or a locked, dragging or not fully released brake are considered unsafe conditions, a single frequency signal and same frequence tuned detectors may be used for both. If differentiation of unsafe conditions is necessary as to type, namely hot journal or brake, or specific car, each tuned detector could have a separate frequency and the query circuit would sequentially transmit the various frquencies.

Each control message will include check words which will be used at the receiving end to reject messages which have been corrupted during transmission. In the event that an erroneous message does pass this test and is accepted, the frequency of control message transmissions will make the reception of two or more identically erroneous control message extremely improbable. The hardware which activates the controls at each unit is sufficiently slow, thus a single erroneous message will not be applied long enough to affect train operation. Finally, there are both software and hardware interlocks to insure that controls cannot be manipulated in an illogical manner. For example, it will be checked both in hardware and software that a reversal of operating direction can only be made with the engine at idle. In the more likely case of one or more consecutive control messages being rejected because of detected errors, the affected power unit would be allowed to continue operating on the basis of its last valid control message, either until it receives a new valid control message, or until a specified period of time had elapsed. In the latter case, the affected power unit would be forced to a known state until communications are restored.

A brake status and control unit 90 is connected electrically to the microprocessor 74 and fluidically to main reservoir pipe 92 and brake pipe 94. The brake control and status unit 90 provides an indication to the microprocessor of the status of the main reservoir pressure, the brake pipe pressure and the brake cylinder pressure. The control outputs of the brake control and status 90 are three electrically operated main valves to provide service brake application, release, and emergency brake applications through the brake pipe as well as dynamic braking control and feedback signals. Electro-pneumatic brake systems are well known and, thus, the details of brake control and status 90 need not be provided in detail.

By providing a control cab at each end of an element facing in opposite directions, a train can be made up from individual elements without concern as to the direction the element is headed. As an alternative, the element may be direction specific with a powered control cab at one end and a powerless control cab or module at the other end. The powerless control cab would contain the same electronics and control hardware as the powered control cab except for interface to an operator and controls and sensors for the propulsion system.

Figure 4:
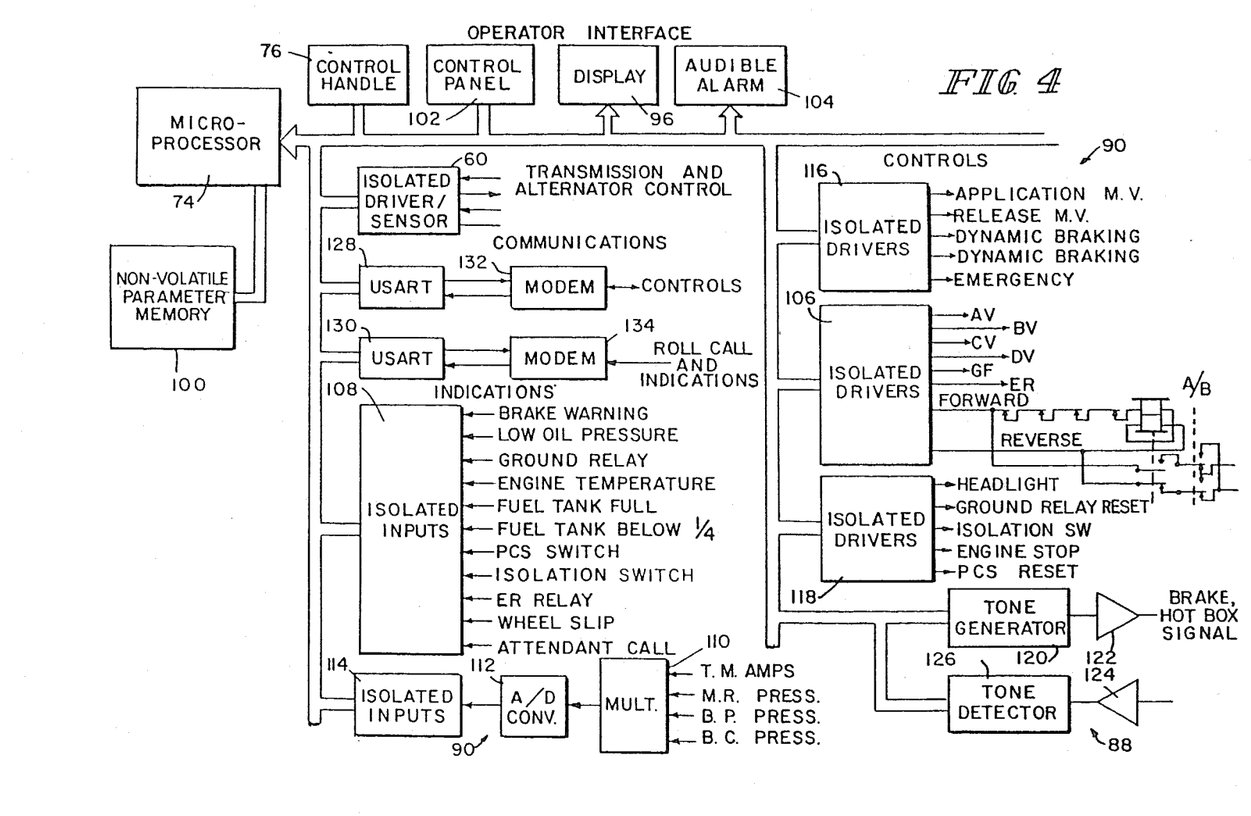
FIG. 4 is a block diagram of the microprocessor and controller incorporating the principles of the present invention.

A more detailed block diagram of the microprocessor and controller is illustated in FIG. 4. The microprocessor 74 includes a non-volatile parameter memory 100 and is connected via the busses to the elements previously described. Shown at the top is the control handle 76, a control panel 102, a display 96 and audible alarm 104. Transmission and alternator control 60 includes isolated driver and sensor. Control signals to the governor of the engine are provided by isolated drivers 106 and inputs received from the propulsion system are provided by isolated inputs 108. The status portion of the brake control and status circuit 90 includes a multiplexer 110 receiving four analog inputs which are converted by A/D converter 112 to digital signals and provided to isolated inputs 114. The controls of the brake control and status circuit 90 includes isolated drivers 116. Miscellaneous control signals are provided by isolated driver 118. The journal and brake status circuit 88 includes tone generator 120, amplifiers 122 and 124 and tone detector 126.

The communication between the master and slave locomotion is provided by USARTs 128 and 130 through modems 132 and 134. USART 128 and modem 132 provide the control communications, whereas USART 130 and modem 134 provides roll call and indications. The signals from both of the USARTs is provided in a serial manner throughout the train and include a single message having a plurality of bits of information. The use of two USARTs allows transmission over separate full duplex lines throughout the train or over the single common full duplex line 87.

When a train is being made up from a group of elements, the controlling power unit must identify every power unit and record each unit number in its consist list. Information must also be passed to the slave units from which they can determine the appropriate response to subsequent commands. For example, power units on opposite ends of an element will interpret the forward/reverse commands differently. An initialization procedure must be performed in order to insure that all the power units function together properly.

One and only one power unit may be designated as the controlling (master) unit in a train. Normally, this unit would be located at the head end of the train, but it is conceivable that under certain circumstances another unit could be designated the master. All other units in the train are designated slave units. The train can only be controlled from the master unit, and commands entered at slave units will have no effect.

When a new element is added to a train, every power unit in the train is forced into an initialization state. This can be accomplished in a number of ways, for example, to withhold control messages for a period of time.

The only control line between power units at either end of an element is the coaxial train line 82 which runs throughout the train. When elements are coupled together to form a train, additional connections can be made between directly adjacent power units by means of train lines carried through the automatic coupler. These connections can be used in the initialization procedure to insure that each element in the train logs on in the appropriate sequence. Each power unit knows its identification number and that of the unit at the opposite end of its element. This latter item of information must be entered into both power units at the time an element is made up.

Once all units are in the initialization mode, the master unit can begin the initialization procedure. Since the master knows the unit number of the power unit at the opposite end of its element, it can send an initialization message addressed to that unit number. The addressed unit checks the contact in the interelement trainline to determine if it is the last element in the train. When not coupled to a following element, two coupler contacts will be shorted together. When coupled, the circuit though the contacts will be broken. The addressed unit responds to the master with a message which indicates that it has properly received the initialization parameters and which contains certain necessary status information.

A portion of the status information indicates whether this unit is the final one in the train. If it is, the initialization in this direction is complete, and the unit number of the final element must be recorded for purposes of remotely controlling the lights on the trailing unit. If not, at least one additional element is connected, and its power units must be initialized and their unit identification numbers must be entered into the master's consist list. The addressed power unit can communicate with the next power unit in sequence through the coupler train lines. By this means it obtains the unit identification number of the next power unit to be intialized, and this information is returned to the master as part of the initialization response message.

An initialization exchange next occurs between the master and the power unit whose identification number was reported in previous response message. Since every power unit either knows or can obtain the identification number of the next power unit in sequence, this process will continue until all elements between the master and one end of the train are entered into the consist list and initialized. If the master unit is located at either end of the train, the process will produce a complete list. As indicated previously under certain circumstances, the master unit may be located internally to the train. In that case the master unit must itself be connected through a trainline coupler to another element, and in a manner similar to that just described it can obtain the unit number of the power unit to which it is coupled. The power units in that element and any succeeding elements could then be initialized and entered in the consist list.

The initialization process would be quite rapid. The exchange between the master end and each slave unit would require on the order of 0.2 seconds assuming a 1200 Baud rate and no retransmissions resulting from garbled messages. Therefore in the worst case of a six element train, the entire process could be completed in two or three seconds.

The initialization message sent from the master to each slave will define the slave's operating parameters. For example, the master unit during normal operation will sense an input device which will indicate running direction. Each control message will contain a control bit indicating either forward or reverse operation. Since the bulk of control information such as throttle position, running direction, braking, etc. applies equally to all slave units, the master will periodically broadcast a control message to all slaves. Each slave must use the information which it has received during system initialization to interpret the control message. Since coupled power units will be joined head-to-head, one must interpret a running direction command bit in one sense, the other in the opposite sense.

Once the operating parameters of a power unit have been stored into its memory during the initialization process, it is important either that this information remain unchanged until reinitialization, or that any change be detected and the power unit involved be brought to a known state until new operating parameters can be gathered. In order to insure reliable system operation, operating parameters must be stored in non-volatile memory such as EEPROM in order that power units can recover from a momentary power loss. Additionally, the ability to write to the parameter memory will be interlocked with external signals to insure that the memory contents can only be modified during initialization. Finally, the memory contents will be periodically checked with a signature analysis to verify that failure in the memory itself will be detected and appropriate action taken.

In addition to the unit identification number and the check bits, the control message includes general control data and power units specific controls as illustrated in Table 1.

TABLE I

CONTROL MESSAGE

| | # of bits |
|---|---|
| Unit Identification Number | 16 |
| General Control Data | |
| AV,BV,CV,DV | 4 |
| Forward | 1 |
| Reverse | 1 |
| B—Dynamic braking | 1 |
| BG—Dynamic braking | 1 |
| Application Magnet Valve | 1 |
| Release Magnet Valve | 1 |
| Emergency | 1 |
| GF—Generator Field | 1 |
| ER—Engine Run | 1 |
| PC—Positive Control | 1 |
| Power Unit Specific Controls | |
| Headlight | 1 |
| Ground Relay Reset | 1 |
| Isolation Switch | 2 |
| Engine Stop | 1 |
| Pcs Reset | 1 |
| Hot Box/Brake Test | 3 |
| Check Bits | 16 |
| Total Bit Count | 55 |

Each control message will include check words which will be used at the receiving end to reject messages which have been corrupted during transmission. In the event that an erroneous message does pass this test and is accepted, the frequency of control message transmissions will make the reception of two or more identically erroneous control messages extremely improbable. The hardware which activates the controls at each unit is sufficiently slow, thus a single erroneous message will not be applied long enough to affect train operation. Finally, there are both software and hardware interlocks to insure that controls cannot be manipilated in an illogical manner. For example, it will be checked both in hardware and software that a reversal of operating direction can only be made with the engine at idle. In the more likely case of one or more consecutive control messages being rejected because of detected errors, the affected power unit would be allowed to continue operating on the basis of its last valid control message, either until it receives a new valid control message, or until a specified period of time had elapsed. In the latter case, the effected power unit would be forced to a known state until communications are restored.

The master unit periodically evaluates the conditions of the slave units, by sequentially addressing each slave unit. The roll call and indication message, in addition to having the unit identification number and the check bits, includes those signals of the appropriate bit length a illustrated in Table 2.

TABLE 2
INDICATION MESSAGE

| | # of bits |
|---|---|
| Unit Identification Number | 16 |
| Brake warning | 1 |
| Low oil pressure | 1 |
| Ground Relay | 1 |
| Temperature | 1 |
| Fuel Tank Full | 1 |
| Fuel Tank Below ¼ | 1 |
| Isolation Switch | 1 |
| PCS | 1 |
| Wheel Slip | 1 |
| ER Relay | 1 |
| Attendant Call | 1 |
| Hot Box/Brake Test Response | 3 |
| Traction Motor Amps | 8 |
| Main Reservoir Pressure | 8 |
| Brake Pipe Pressure | 8 |
| Brake Cylinder Pressure | 8 |
| Check Bits | 16 |
| Total Bit Count | 78 |

The information from the master control cab is transmitted to the slave control cab which emulates the master control cab and provides propulsion and brake signals from both ends of the train unit.

To summarize, the propulsion control from manual master control 76 is provided as a signal to the microprocessor over the conventional A, B, C and D valve wires 78. These wires lead from the master control 76 to the microprocessor where they are decoded and put on a serial output to be decoded both locally and by the other processor in the train to energize the proper combination at the A, B, C and D control valves on the engine governor. The microprocessor monitors the condition of the propulsion system and may modify the A, B, C and D control valves, the alternator, the AC motors and the transmission.

With respect to the brake control, the single handle master control 76 is also used to provide output signals to the microprocessors which are encoded and used locally as well as remotely. The motion of the master controller in the braking zone will cause, through the microprocessor, initial application of the dynamic brake on all units. Further motion of the handle into the braking zone increase dynamic braking, but in the event of failure of one or more dynamic brakes, the train would exhaust the brake pipe air at a service rate of reduction. This reduction would operate directly and would also trigger a triple control switch such as a PS-68 or a GSX3. The output of the triple control switch would be inputted to the microprocessor which would encode, transmit and decode it so as to operate the application or release magnet valves in each of the control cabs. This would provide a brake pipe reduction essentially instantaneously and simultaneously every thousand feet in the train. This would eliminate the necessity for complicated brake equipment and electrical connections on cars. When total braking (dynamic plus air if required) reaches a level proportional to master control handle position, no further change would occur in braking level.

As the control handle 76 is moved further into the braking zone, further action of the dynamic brake and/or air brake would occur, resulting in additional dynamic brake effort, and/or additional brake pipe pressure reduction. This would be repeated by the microprocessor through the serial bus to trailing microprocessors, where operation of dynamic brake and the application and release magnet valves would be repeated, thus producing the total brake effort requested by the operator. Finally, motion of the master control 76 into the emergency position would cause direct venting of the brake pipe. This would be propagated by pneumatic vent valves approximately every 75 feet along the train and the train safety is insured independent of the microprocessors. Brake pipe venting would also cause engine isolation and force engines back to idle speed so as to overcome any possible computer malfunction. At the same time, the microprocessor functions which could enhance safety, such as operation of redundant emergency magnet valves and all reporting functions, would not be cut off by the emergency application of the brakes. Reconnection of the microprocessor control to the propulsion control and brake release devices would be established by restoration of the brake pipe pressure to, for example 40 psi. This can only take place after the time out of the emergency brake vent valves, which assure that the train will stop after an emergency brake application.

Figure 5:
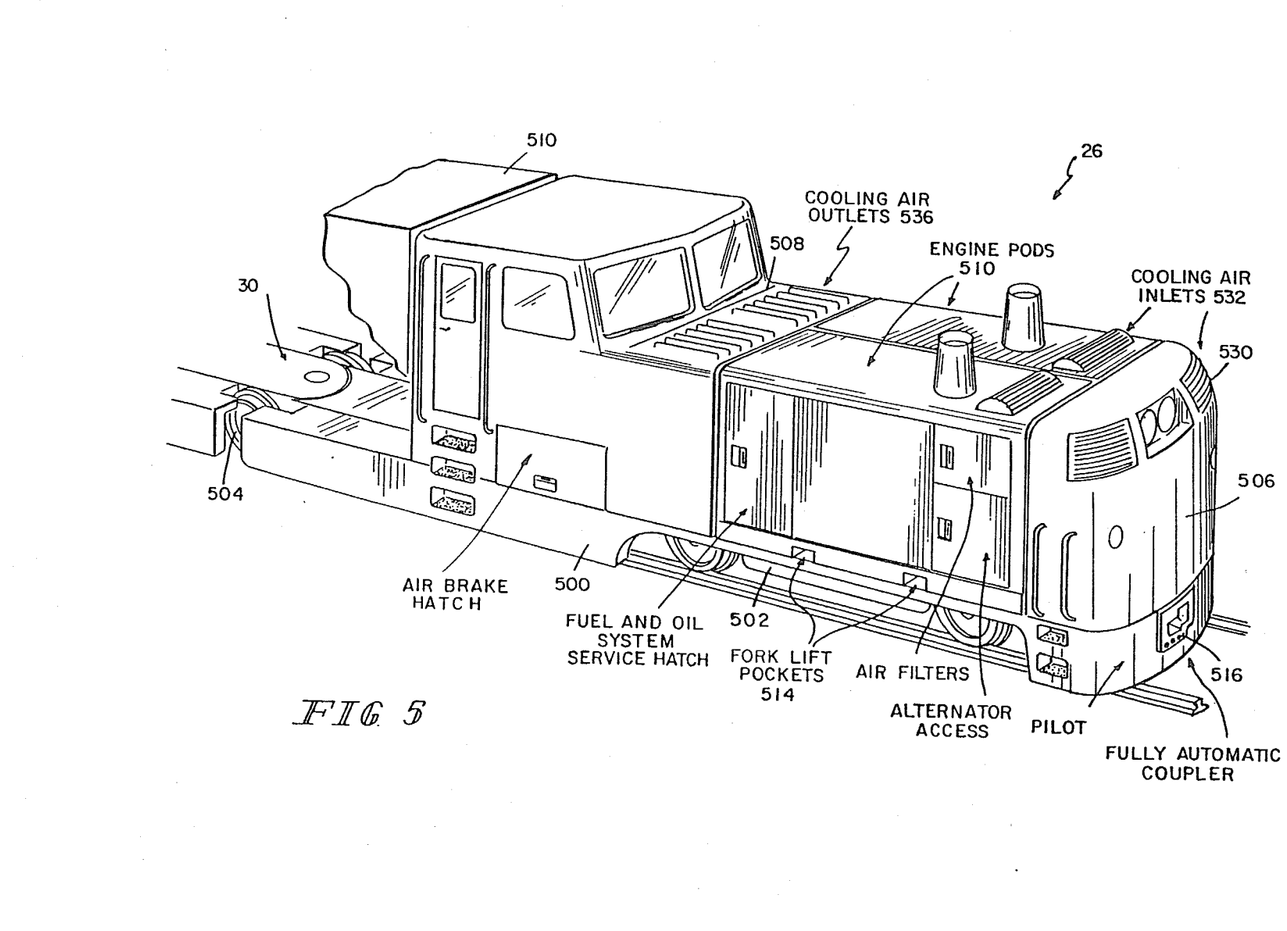
FIG. 5 is a perspective view of a control cab incorporating the principles of the present invention.

The unique design of the control cab is illustrated in FIG. 5. The control cab 26 includes a frame 500 having a non-powered twin axle truck 502 at the front thereof and a single-powered axle 504 at its rear. The rear control cab 28 is identical to the front control cab 26 except that the single axle 504 at its rear is either eliminated or displaced from its rear so that it may be joined to an adjacent car 30 as will be explained below for the deck construction. The housing includes a front portion 506 and a rear portion 508 which includes the control cabin for the operator. A fuel tank 510 is provided behind the cabin 508 and may be a permanent part of the frame or may be removably attached. A pair of engine pods 512 are secured to the frame between the front portion 506 and 508. As will be discussed with respect to FIG. 6, the engine pods 512 have open framed and rear lateral walls so as to provide continuous air communication between the front frame 506 and the rear frame 508 through the engine pods 512. This aids the cooling of the equipment.

Figure 6:
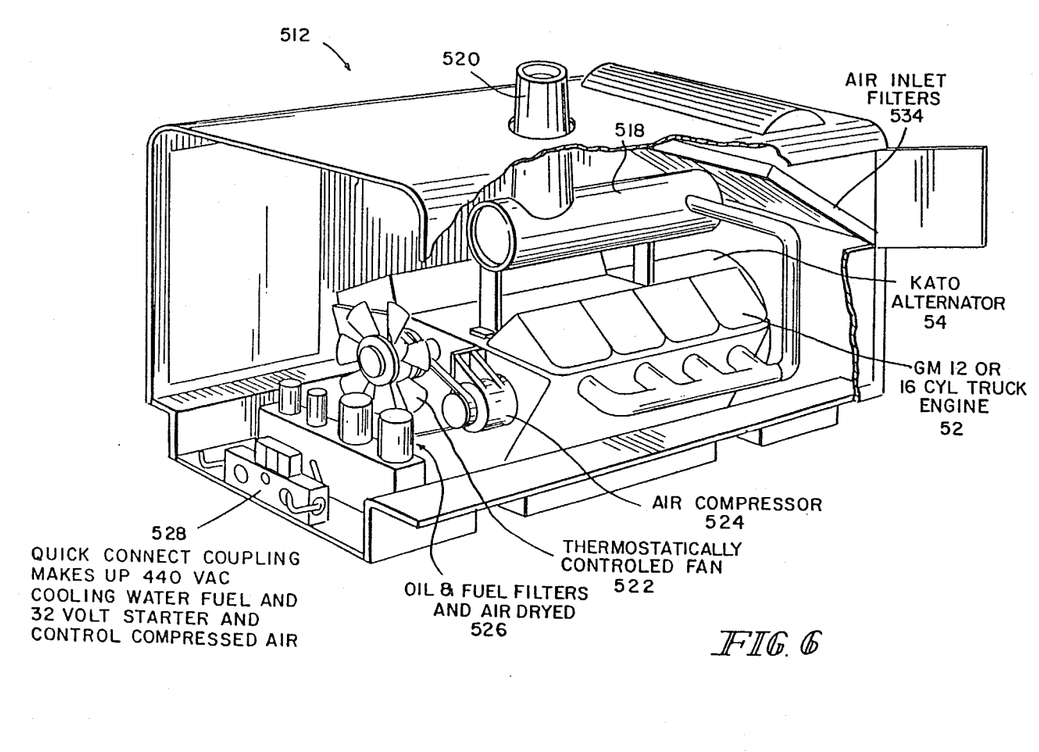
FIG. 6 is a perspective view of an engine pod incorporating the principles of the present invention.

Each engine pod 512 includes a pair of apertures 514 which will receive the tines of a forklift such that the engine pods may be removed for servicing. This is one of the unique features of the present invention wherein the engine pods may be removed without removing the control cab 26 for service and therefore reducing the need for a round house or other type of service facilities. A fully automatic coupler 516 on the front of the control cab 26 connects the engine with adjacent elements mechanically, electrically and pneumatically.

The engine pods 512 includes a pallet or base 517 to which the top and longitudinal side walls are mounted. Enclosed within the pod 512 is the truck engine 52 driving alternator 54. A muffler 518 and stack 520 are provided on the output of the engine 52. A thermostatically controlled fan 522 is also connected to the output of the engine as well as an air compressor 524. Oil and fuel filters and air dryer 526 are connected between the engine 52 and the air compressor 524 and the quick connect coupling 528. The quick connect coupling provides electrical and fluid interconnect between the pod 522 and the remainder of the controls and systems of the control cab 26. The electrical interconnect includes a 440 volt AC signal from the alternator 54, which is used to drive the squirrel cage motors on the cars and a 32 volt starter and control for the engine 52. The fluid interconnection is the compressed air from the air compressor 524, cooling fluid or water from the radiator which is positioned in the control cab 26 and fuel lines.

Thus, it can be seen that the items which have a service requirement more frequent than the remainder of the system are provided on the pallet 517. This includes the motor, alternator and air compressor. The portions of the system which require little maintenance for example, the radiator, the fuel tank and the microprocessor are all provided in the permanent part of the control cab 26. By providing the radiator in the permanent part of control cab 26, and using a quick disconnect, the radiator systems of both pieces are sealed and, thus, do not require draining for pod removal/replacement.

With respect to the air flow through the engine pod and the remainder of the control cab, incoming air through air inlets 530 on the forward frame 506 and 532 on the top of the engine pods are transmitted through air inlet filter 534 in the engine pod. They are transmitted through the engine pod and exit cooling air outlets 536 on the rear housing 508.

Figure 7:
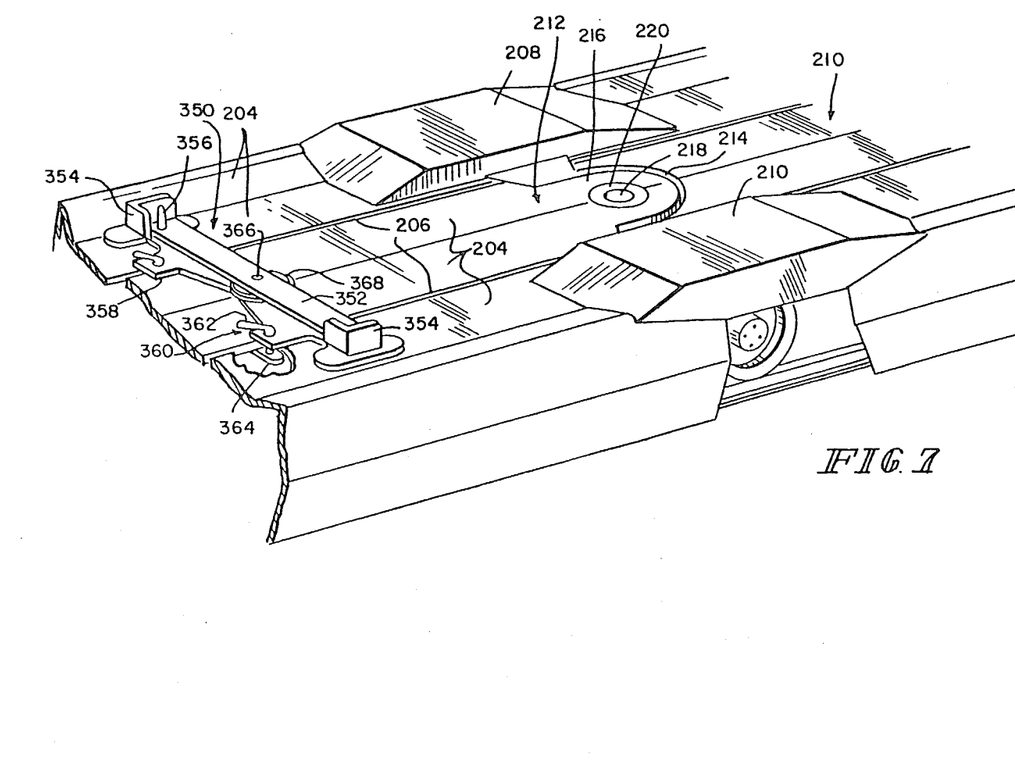
FIG. 7 is a perspective view of a pair of cars and a container hold down device incorporating the principles of the present invention.

The individual platform or cars 30 of the train make up a continuous deck running for a length of approximately 1,000 feet constituting approximately 42 cars. The deck arrangement over the to-be-discussed articulated single axle is such that a truck can be driven onto it from the side and "parallel parked" upon it. The short platform reduces both relative angular motion of the platform as the train rounds a curve and vertical bending to much lower values than those experienced on conventional trains. The deck of the car 30 consists basically of a series of welded extrusions, shown in FIG. 8 on a frame 202 and connected by welded plate sections 204. This is illustrated in FIG. 7. The welds are located away from the high stress areas so as to minimize cost and maximize safety and reliability. This construction allows a stiff deck to be combined with a very low cost lightweight deck. A pair of deck length T slots 206 are provided to which container mounting devices may be engaged at any point as will be discussed below. The deck length T's are open on the bottom through elongated holes so as to be self-cleaning under all weather conditions.

In the area over the wheels, a forged bridge plate 208 connects the outer edges of the two adjacent decks so that a semi-trailer or tractor may be rolled easily from one deck to another without disturbing either the car or the tractor trailer structure. The bridge plates are equipped with high impact plastic bearings and are guided parallel with the frame edge during curving. Thus, the joint will always be bridged and loading and unloading the trains even on a slight curve is possible.

The car 30 has a wheeled end 210 and a wheeless end 212. Thus, each car only has a single axle and is supported at its wheeless end by the axle of the adjacent car. The wheeled end 210 includes a longitudinal recess 214 in the deck and the wheeless end 212 includes a neck portion 216. The longitudinal recess 214 includes a pin 218 which receives a swivel plate 220 in the neck 216. The wheeless end 216 is positioned adjacent to the wheeled end 210 of an adjacent vehicle jacked up and the swivel plate 220 is positioned above pin 218 and lowered so as to interconnect and latch the two adjacent cars together. The end structure which extends over the wheels at the wheeled end 210 includes a conventional end under frame 222 that is constructed and welded to the main frame 202. The wheeless end 212 also includes an underframe 224 which is welded to the main frame 202. It should be noted that the deck and frame at the wheeled end 210 have a reduced lateral dimension such that it lies between the wheels. The underframe 222 and 224 form the bottom of the neck 216 and the longitudinal opening 214.

As shown in FIG. 5, the front control cab 26 includes powered axle 204 and receives the wheeless end of the first car 30. The rear control cab 28 of FIG. 1 includes a neck 216 (not shown) which is received by longitudinal recess 214 of the adjacent car 30. As discussed previously, rear control cab 28 either displaces or eliminates axle 204.

Figure 8:
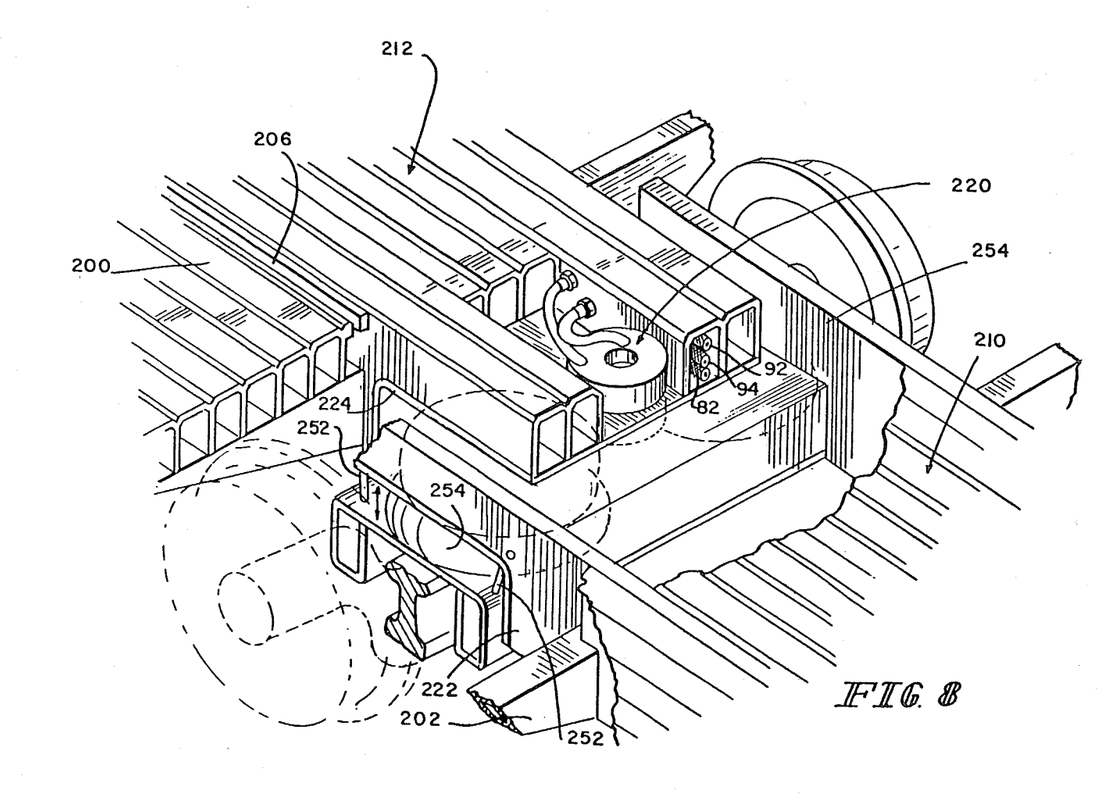
FIG. 8 is a cutaway of a portion of the pair of cars of FIG. 7.

The extruded deck elements being hollow provides the insertion of the electrical as well as fluid conduits therethrough. As illustrated in FIG. 8, brake pipe 92 and main reservoir pipe 94 and cable 82 for the car status indicator and the control cab to control cab communication are provided within the extruded deck 200. Also provided in the deck of the first and last five cars of each section are the three phase power cables 56 and the transmission control cable 70. Pipes 92 and 94 and conduits for the coaxial cables would be formed in the extrusion with actual pipes being plastic tubing with reversible fittings at each end. The actual joint would be bridged by flexible reinforced hoses at each articulation. Coaxial electric connectors would also be provided at the joints.

The suspension for the car as illustrated in FIG. 8 includes a spring plank 250, non-swiveling and a non-sprung member guided from the underframe 220 at the wheeled end 210 by radius rods 252. A pair of air springs are positioned on top of the spring plank 250 and beneath the underframe 222. The air springs are connected to the main reservoir pipe 94 by fitting 256.

Figure 9:
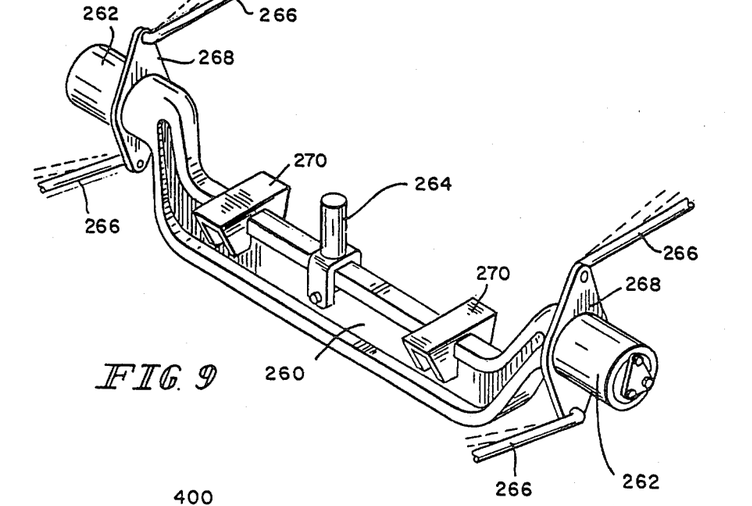
FIG. 9 is a perspective view of a non-driven axle assembly incorporating the principles of the present invention.

The axle assembly as illustrated in FIG. 9 includes a single drop center, non-rotating forged axle 260 with independent wheel bearings coaxially projecting from the edge thereof. The center of the forged axle 260 is dropped relative to the coaxial bearings 262. A swivel pin 264 connects the axle to the spring plate 250 independently of the pin 218 which interconnects adjacent cars. Links 266 connect the centering levers 268 at each end of the axle to both of the adjacent cars. This produces articulated joints. Side bearings 270 are provided on the top of the center portion of the axle 260.

The vertical and roll suspension is taken by the air springs 254 while the swiveling of the axle 260 as the car rounds a curve is taken between the axle 260 and the non-swiveling spring plank 250. Lateral motion of the cars taken by the deflection of the air springs 254 and centering is through elastomeric lateral stops. The swiveling of the axle 260 is guided by the centering levers 268 and links 266 such that when the car rounds a curve, the axle is always taking a position bisecting the angle made by the two adjacent cars.

Figure 10:
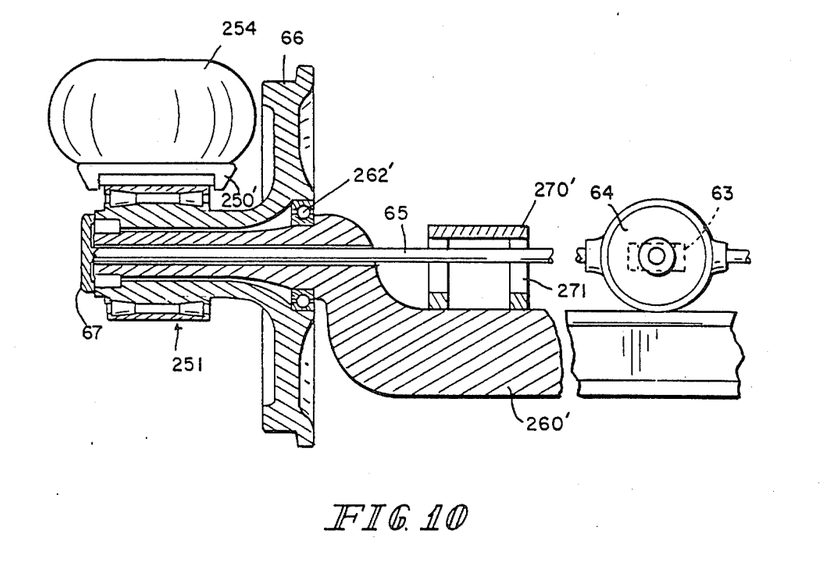
FIGS. 10 and 11 are partial, top and side views respectively of a driven axle assembly incorporating the principles of the present invention.
Figure 11:
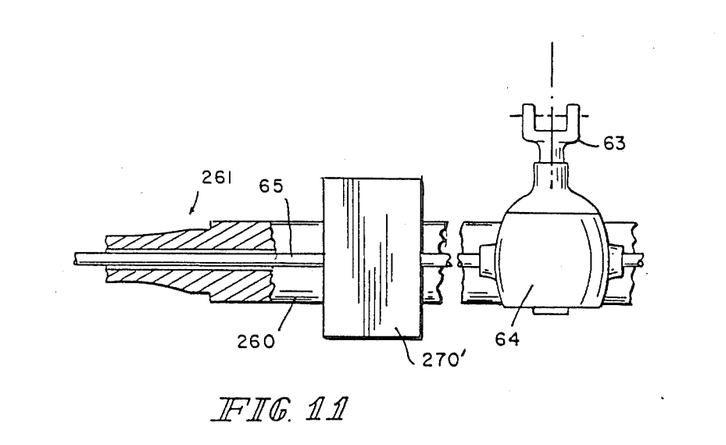

The suspension for the power driven or the first five and last five cars 30 is modified as illustrated in FIGS. 10 and 11. It should be noted that the elements of the suspension system which have the same function in FIGS. 10 and 11 as those in FIGS. 8 and 9 are shown in FIGS. 10 and 11 with the same numeral primed. The electric motor 58, transmission 60 and reversing gear 62 of FIG. 2 are secured to the car frame. The differential 64, axle 65 and wheel 66 are connected to the car frame by air bags 254'. A universal 63 connects the differential 64 and the reversing gear 62 to accommodate the unsprung and sprung portions of the propulsion system.

The drive shafts 65 extend from the differential 64 through an opening in side bearings 270' a journal 261 in axle 260' and is connected to wheel 66 by drive cap 67. The wheel 66 is mounted to axle 260' by wheel bearing 262'. A roller bearing 251 is mounted about the exterior of wheel 66 and allows spring plank 250' and air bag 254' to ride thereon. The axle 260' is pivotally mounted to the car. Thus, it can be seen that the axle 260' and the air bag suspension has been modified to accommodate the propulsion system.

Figure 12:
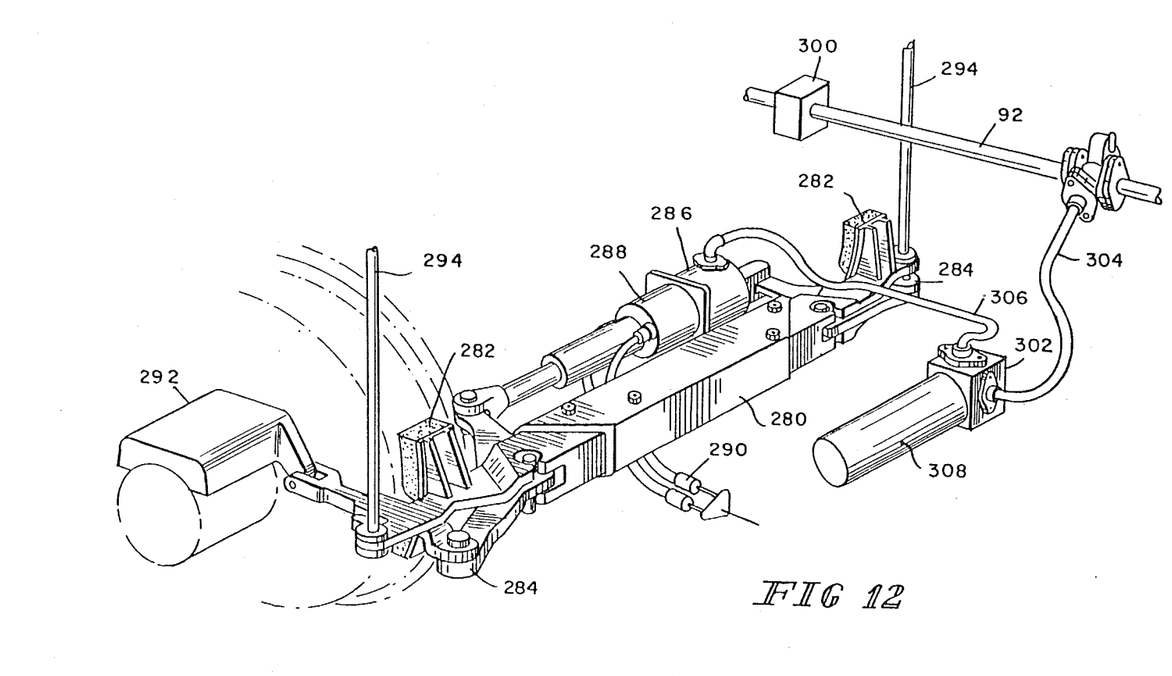
FIG. 12 is a perspective view of a brake assembly.

The brake system for the single axle is illustrated in FIG. 12 as including a single brake beam 280 having brake heads 282 at the ends thereof. A pair of bell cranks 284 are pivotally mounted to the ends of the brake beam 280. Connected to the other end of the bell cranks 284 is a brake cylinder 286 with slack adjuster 288. A pair of cables 290 are provided for manually actuating brake cylinder 286. The other end of the bell cranks 284 are mounted by a special adapter 292 at the ends of the axle assembly. Suspension links 294 connect the brake assembly to the frames of the cars and permit it to swivel underneath the non-swivelling spring plank. This is an example of a brake system which can be used.

The pneumatic control of the brake system includes a venting valve 300 connected to the brake pipe 92 which senses an emergency brake application and accelerates the venting of the brake pipe on each car. The vent valve 300 is placed approximately every 75 feet and opens for pressure drops of 7 psi or greater. Also connected to brake pipe 92 is a triple valve 302 connected thereto by conduit 304. The triple valve 302 is also connected to the brake cylinder 280 by conduit 306. A combined auxiliary reservoir and emergency reservoir 308 is also connected to the triple valve 302. The triple valve 302 is a simple triple valve and not the sophisticated AB, ABD or ABDW valve. It performs a release and a charging function of the auxiliary and emergency reservoir 308 as well as a service, service lap and emergency function.

As is well known, upon initialization, the triple valve 302 charges the emergency and auxiliary reservoirs and releases the brake cylinder 286. Upon a service application sensed by a drop in the pressure of the brake pipe 92, the triple valve connects the auxiliary reservoir to the brake cylinder and laps once the pressure in the auxiliary reservoir matches the brake pipe. If further braking is required, further reduction of the brake pipe pressure will produce even further reduction in the auxiliary pressure providing greater pressure to the brake cylinder 286.

To affectuate a release, the brake pipe pressure is increased and the triple valve connects the brake pipe to the auxiliary reservoir to charge the auxiliary reservoir. The triple valve also connects the brake cylinder to exhaust until the auxiliary pressure matches the brake pipe pressure in which case the triple valve remains in the release position.

For an emergency application, the triple valve 302 first connects the auxiliary reservoir 308 to the brake cylinder 286 and upon equalization between the auxiliary reservoir and brake cylinder, the auxiliary is disconnected and the emergency reservoir is connected to the brake cylinder. Thus, a substantially increased emergency braking pressure is provided to brake cylinder 286. Because a small slack adjusted brake cylinder is used, the volume of auxiliary reservoir required is reduced relative to today's conventional car. More importantly, the combined application of the auxiliary and emergency reservoirs to brake cylinder is not simultaneous, but sequentially separate, thus permitting a great reduction in the size of the emergency reservoir. For example, their typical sizes of the auxiliary and emergency reservoir are 3,500 and 2,500 respectively, while in the present invention, they may be reduced to 650 and 135 respectively. Thus, the emergency reservoir may be from 25% to 50% of the auxiliary reservoir.

The brake control system including venting valve 300 and triple valve 302' are described in detail in U.S. patent application entitled "Truck Mounted Pneumatic Brake Control System" by Thomas H. Engle filed Sept. 16, 1985, U.S. Ser. No. 776,763, now U.S. Pat. No. 4,653,812 which is incorporated herein by reference.

A unique container mounting means 350 is illustrated in FIG. 7. Securing device 350 includes a top member 352 having a pair of receptacle corner receiving elements 354 and pins 356 at the ends thereof. A lower member 358 is secured to the deck of the cars 30 by latches 360. Latch 360 includes a handle 362 and an inverted T-shaped dog 364 pivotally mounted to the lower member 358. The handle positions T-shaped dog 364 parallel to the slots such that it can be inserted therein and then is rotated 90° such that the horizontal portion of the T-shaped dog 364 lies against and secures the lower member 358 to the horizontal portion of the inverted T-shaped slots 206. The upper member 352 is pivotally connected to the lower member 358 by pin 366 and rubber bushing 368. Securing device 350 allows a small degree of swivel such that a container which extends across the juncture of a pair of adjacent cars will be guided around a curve while transmitting lateral and longitudinal loads into the deck. The rubber bushing is so dimensioned that in rounding a curve, the longitudinal compressive fences imposed on the container by the fore shorting of the continuous mount longitudinal center distance does not cause excessive longitudinal forces to be put into the container or the deck.

Figure 13:
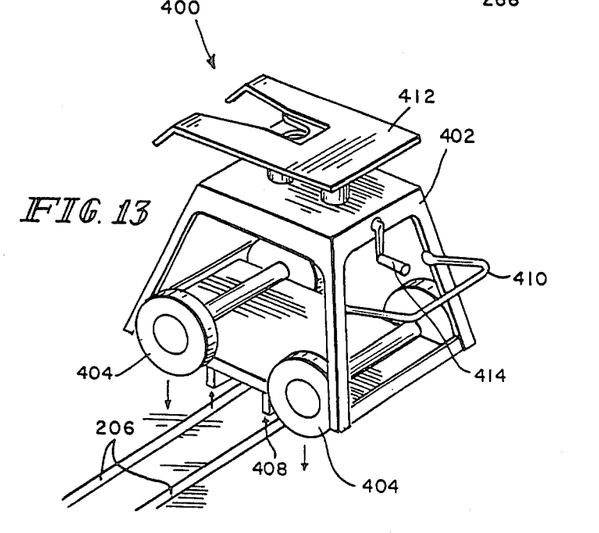
FIG. 13 is a perspective view of a portable stanchion incorporating the principles of the present invention.

A portable stanchion 400 is illustrated in FIG. 13 for securing truck trailers to the deck of the train. Stanchion 400 includes a carriage 402 having four retractable coaster wheels 404, 402 extnding from the bottom thereof. Also extending from the bottom are two pairs of T-shaped slot engaging dogs 408 to be received in the T-slots 206 of the deck of the cars. Control lever 410 is interconnected mechanically to the coaster wheels 404 and the T-shaped dogs 408 so as to simultaneously raise the wheels and lower the dogs or simultaneously raise the dogs and lower the wheels. A latch mechanism is provided to lock the control handle 410 in one of its two final positions. The stanchion 400 includes a kingpin lock 412 to receive the kingpin of the fifth wheel kingpin of a trailer. A crank 414 is provided to raise the king pin lock or platen 412 under the kingpin area of a parked trailer and locking the kingpin into place. The portable stanchion 400 would be used in the following method. A driver would drive his trailer onto the car 30, drop the landing gear and pull the tractor away. The portable stanchion 400 would be positioned under the kingpin of the trailer. Lever 414 is raised to lock the kingpin to the stanchion. Handle 410 is then moved raising the wheels and lowering the dogs 408 into the slots 206. For providing the dogs 406 as lateral elements and parallel to the plane of the axles of wheels 404, the stanchion 400 is less likely to move since the wheels are at an angle orthogonal to the slots in which the dogs are engaged.

Although many systems are discussed above in connection with an intermodal integral train, they are equally applicable to other integral trains and even non-integral trains.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A propulsion system for driving at least one axle of a rail vehicle comprising:
   an engine;
   means connected to said engine for generating a three phase alternating current electrical signal as a function of the speed of said engine;
   a three phase alternating current motor directly responsive to said three phase alternating current electrical signal;
   variable automatic mechanical transmission means coupled to said electrical motor for transmitting torque to said axle;
   means for measuring vehicle speed; and
   first control means for controlling the speed of said engine and controlling said variable transmission means as a function of a selected vehicle speed and measured vehicle speed.

2. A propulsion system according to claim 1, including second control means connected to said first means for selecting one of a plurality of preselected vehicle speeds.

3. A apropulsion system according to claim 2, wherein said first control means includes a governor for controlling the speed of said engine as a function of said selected speed.

4. A propulsion system according to claim 1, wherein said axle is bifurcated into two portions and includes a differential connecting said transmission to said axle for separately controlling each portion of said axle.

5. A propulsion system according to claim 4, wherein said vehicle includes a frame, said electric motor and transmission means are mounted unsprung to said frame and including air springs mounting said axle and differential to said frame.

6. A propulsion system according to claim 4, wherein said transmission means includes a reversing gear.

7. A propulsion system according to claim 1, wherein said first control means selects gears and shifting points of said transmission means as a function of said measured vehicle speed and selected vehicle speed.

8. A propulsion system for a train having a first plurality of rail vehicles comprising:
   an engine on a first vehicle;
   means on said first vehicle and connected top said engine for generating a three phase alternating current electric signal as a function of the speed of said engine;
   a plurality of three phase alternating current electric motors, at least one of each on a second plurality of vehicles and each directly responsive to said three phase alternating current electric signal;
   a plurality of variable automatic mechanical transmission means coupled to a respective three phase alternating current electric motor for transmitting torque to a respective axle;
   means for measuring vehicle speed; and
   first control means for controlling the speed of said engine and controlling said plurality of variable transmission means as a function of a selected vehicle speed and measured vehicle speed.

9. A propulsion system according to claim 8, wherein said engine and said generating means are mounted to a pallet which is removably attached to said first vehicle.

10. A propulsion system according to claim 8, wherein said first control means selects gears and shifting points of said transmission means as a function of said measured vehicle speed and selected vehicle speed.

11. A propulsion system for driving at least one axle of a rail vehicle comprising:
   an engine;
   an alternator connected to said engine for generating a three phase alternating current electrical signal as a function of the speed of said engine; and
   a three phase alternating current electric motor connected mechanically to said axle via a variable automatic mechanicl transmission and electrically to said alternator directly for driving said axle as a function of said three phase alternating current electrical signals and state of said transmission and for reflecting a load on said axle to said engine through said alternator;
   means for measuring vehicle speed; and
   first control means for controlling the speed of said engine and controlling said variable transmission means as a function of a selected vehicle speed and measured vehicle speed.

* * * * *